US008463495B2

(12) United States Patent
Spohn et al.

(10) Patent No.: US 8,463,495 B2
(45) Date of Patent: Jun. 11, 2013

(54) METHOD FOR CONTROLLING EXHAUST GAS HEAT RECOVERY SYSTEMS IN VEHICLES

(75) Inventors: Brian L. Spohn, Holly, MI (US); George M. Claypole, Fenton, MI (US); Richard D Starr, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 12/957,755

(22) Filed: Dec. 1, 2010

(65) Prior Publication Data

US 2012/0143437 A1    Jun. 7, 2012

(51) Int. Cl.
   *F01M 5/00*    (2006.01)
   *F16H 57/04*   (2010.01)

(52) U.S. Cl.
   CPC ................................. *F16H 57/0413* (2013.01)
   USPC .................... 701/36; 123/41.31; 123/41.33

(58) Field of Classification Search
   CPC ........ F01M 5/001; F01N 5/02; F01N 2240/02; F16H 57/0412
   USPC .......................................................... 701/36
   IPC ........................................................ F01N 5/02
   See application file for complete search history.

(56) References Cited

U.S. PATENT DOCUMENTS

| | | | | |
|---|---|---|---|---|
| 5,638,774 A | * | 6/1997 | Albertson et al. | 123/41.33 |
| 6,196,168 B1 | * | 3/2001 | Eckerskorn et al. | 123/41.33 |
| 6,427,640 B1 | * | 8/2002 | Hickey et al. | 123/41.31 |
| 6,536,381 B2 | * | 3/2003 | Langervik | 123/41.33 |
| 6,772,715 B2 | * | 8/2004 | Pfeffinger et al. | 123/41.31 |
| 7,210,522 B2 | * | 5/2007 | Gruian | 165/202 |
| 7,267,084 B2 | * | 9/2007 | Lutze et al. | 123/41.02 |
| 7,467,605 B2 | * | 12/2008 | Szalony et al. | 123/41.04 |
| 7,634,978 B2 | * | 12/2009 | Boudard et al. | 123/41.31 |
| 7,665,513 B2 | * | 2/2010 | Sasaki | 165/298 |
| 7,832,204 B2 | * | 11/2010 | Bidner et al. | 60/320 |
| 8,042,609 B2 | * | 10/2011 | Samie et al. | 165/202 |

(Continued)

FOREIGN PATENT DOCUMENTS

GB    2429763 A    *    3/2007

OTHER PUBLICATIONS

Chau et al., "Emerging Energy-Efficient Technologies for Hybrid Electric Vehicles", Proceedings of the IEEE, vol. 95, No. 4, Apr. 2007, pp. 821-835.*

*Primary Examiner* — James Trammell
*Assistant Examiner* — Todd Melton
(74) *Attorney, Agent, or Firm* — Quinn Law Group, PLLC (57) ABSTRACT

A method of operating a vehicle including an engine, a transmission, an exhaust gas heat recovery (EGHR) heat exchanger, and an oil-to-water heat exchanger providing selective heat-exchange communication between the engine and transmission. The method includes controlling a two-way valve, which is configured to be set to one of an engine position and a transmission position. The engine position allows heat-exchange communication between the EGHR heat exchanger and the engine, but does not allow heat-exchange communication between the EGHR heat exchanger and the oil-to-water heat exchanger. The transmission position allows heat-exchange communication between the EGHR heat exchanger, the oil-to-water heat exchanger, and the engine. The method also includes monitoring an ambient air temperature and comparing the monitored ambient air temperature to a predetermined cold ambient temperature. If the monitored ambient air temperature is greater than the predetermined cold ambient temperature, the two-way valve is set to the transmission position.

8 Claims, 4 Drawing Sheets

U.S. PATENT DOCUMENTS

| | | | |
|---|---|---|---|
| 8,116,953 B2 * | 2/2012 | Lopez | 701/54 |
| 2004/0103947 A1 * | 6/2004 | McLane et al. | 137/625.47 |
| 2004/0108006 A1 * | 6/2004 | McLane et al. | 137/625.47 |
| 2004/0108007 A1 * | 6/2004 | McLane et al. | 137/625.47 |
| 2005/0202933 A1 * | 9/2005 | Sorab et al. | 477/161 |
| 2006/0060346 A1 * | 3/2006 | Sasaki | 165/297 |
| 2008/0041046 A1 * | 2/2008 | Bering | 60/320 |
| 2008/0073065 A1 * | 3/2008 | Samie et al. | 165/96 |
| 2009/0101312 A1 * | 4/2009 | Gooden et al. | 165/104.19 |
| 2009/0182473 A1 * | 7/2009 | Lopez | 701/51 |
| 2009/0266311 A1 * | 10/2009 | Meyer | 123/41.1 |
| 2010/0095996 A1 * | 4/2010 | Bell et al. | 136/201 |
| 2010/0180839 A1 * | 7/2010 | Otterstrom et al. | 123/3 |
| 2011/0088378 A1 * | 4/2011 | Prior et al. | 60/320 |
| 2011/0099989 A1 * | 5/2011 | Prior et al. | 60/320 |
| 2011/0131961 A1 * | 6/2011 | Lee et al. | 60/320 |
| 2012/0048504 A1 * | 3/2012 | Park et al. | 165/41 |

* cited by examiner

METHOD FOR CONTROLLING EXHAUST GAS HEAT RECOVERY SYSTEMS IN VEHICLES

STATEMENT REGARDING FEDERALLY SPONSORED RESEARCH OR DEVELOPMENT

This invention was made with U.S. Government support under an Agreement/Project number: vss018, DE-FC26-08NT04386, A000, awarded by the Department of Energy. The U.S. Government may have certain rights in this invention.

TECHNICAL FIELD

This disclosure relates to control of exhaust gas heat reclaim, recovery, or recirculation systems for vehicles.

BACKGROUND

Internal combustion engines produce energy by combustion of a fuel with (usually) air in a combustion chamber. The combustion process in internal combustion engines produces power to move the vehicle, usually converting the linear motion within the combustion chamber to rotation, but also produces heat.

The combustion products—uncombusted fuel, unused oxygen, and byproducts, in the form of (often) hot exhaust gases—are expelled through an exhaust system taking the combustion products away from the engine. Exhaust gas heat recovery is designed to remove heat from the exhaust gas of engines and transfer it elsewhere, such as to a water circuit. The interior of the car may be warmed using exhaust heat.

SUMMARY

A method of operating a vehicle including an engine, a transmission, and an exhaust gas heat recovery (EGHR) heat exchanger is provided. The vehicle further includes an oil-to-water heat exchanger providing selective heat-exchange communication between the engine and transmission. The method includes controlling a two-way valve, which is configured to be set to one of an engine position and a transmission position. The engine position allows heat-exchange communication between the EGHR heat exchanger and the engine, but does not allow heat-exchange communication between the EGHR heat exchanger and the oil-to-water heat exchanger. The transmission position allows heat-exchange communication between the EGHR heat exchanger, the oil-to-water heat exchanger, and the engine.

The method also includes monitoring an ambient air temperature and comparing the monitored ambient air temperature to a predetermined cold ambient temperature. If the monitored ambient air temperature is greater than the predetermined cold ambient temperature, the two-way valve is set to the transmission position.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
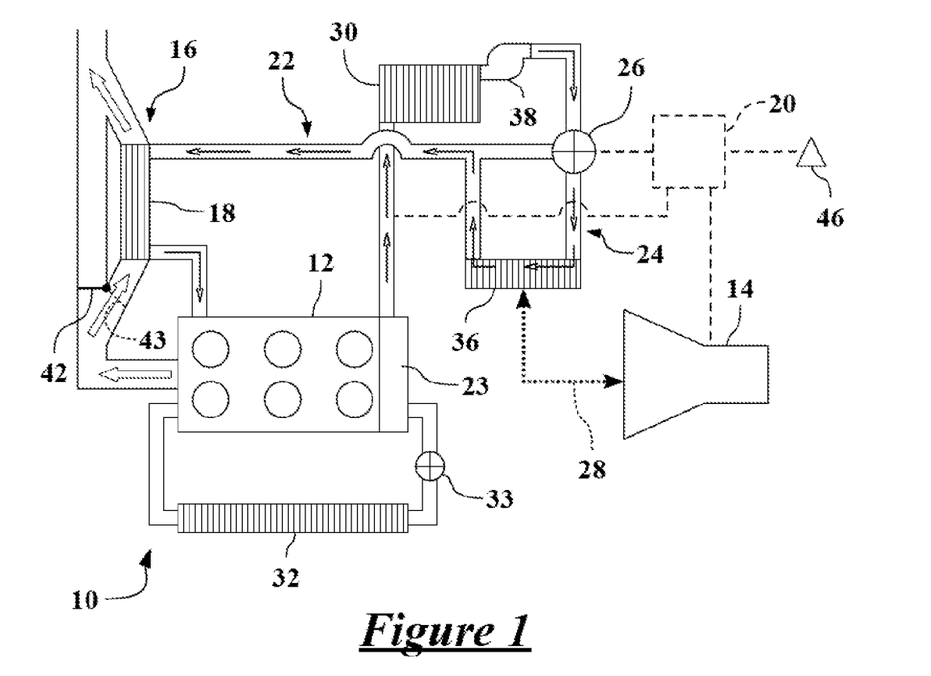
FIG. 1 is a schematic diagram of an exemplary hybrid vehicle powertrain having an exhaust gas heat recovery (EGHR) system in communication with an engine and a transmission.
Figure 2:
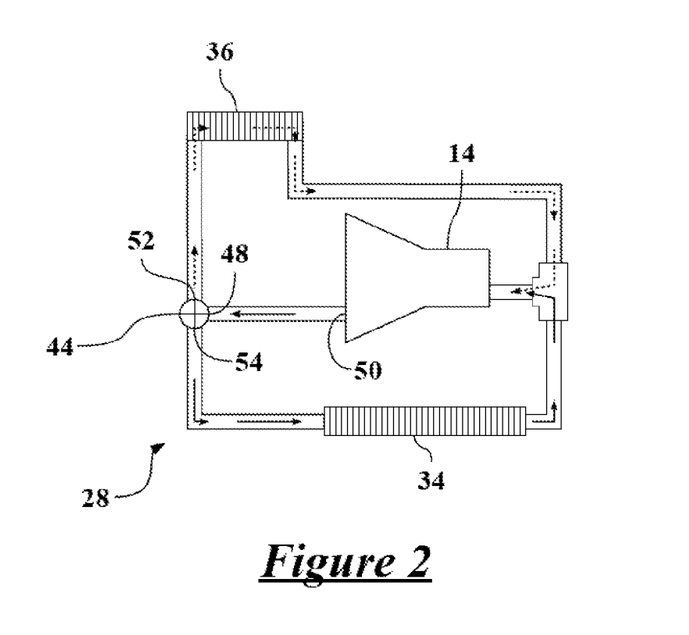
FIG. 2 is a schematic diagram of a transmission oil circuit for the EGHR system shown in FIG. 1.

Referring to the drawings, wherein like reference numbers correspond to like or similar components whenever possible throughout the several figures, there is shown in FIG. 1 and FIG. 2 a schematic diagram of a heat management system 10 or an exhaust gas heat recovery (EGHR) system. The heat management system 10 is in selective fluid flow and heat-exchange communication with an internal combustion engine 12 and a transmission 14 of a vehicle (not shown). FIG. 1 shows the system view of the heat management system 10, and FIG. 2 shows a detail view of the transmission portion of the heat management system 10 shown in FIG. 1.

The engine 12 is drivingly connected to the transmission 14, which may be a hybrid transmission having one or more electric machines (not separately shown). Alternatively, the vehicle may include one or more electric machines acting directly on the engine output or the transmission input. The engine 12 releases exhaust gas through an exhaust pipe or exhaust system 16, which includes an EGHR heat exchanger 18, as explained herein.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

FIG. 1 shows a highly-schematic control architecture or control system 20 for the heat management system 10. The control system 20 may include one or more components (not separately shown) with a storage medium and a suitable amount of programmable memory, which are capable of storing and executing one or more algorithms or methods to effect control of the heat management system 10. Each component of the control system 20 may include distributed controller architecture, such as a microprocessor-based electronic control unit (ECU). Additional modules or processors may be present within the control system 20.

An engine water circuit 22 moves coolant or water from the engine 12 through, eventually, the EGHR heat exchanger 18, such that the engine water circuit 22 and the EGHR heat exchanger 18 are in heat-exchange communication. The terms water and coolant are generally used interchangeably herein. As used herein, heat-exchange communication refers to purposeful, direct heat exchange between two or more fluids through a heat exchanger device. In actual implementation on a vehicle, heat may also be transferred between components by radiant or conductive heat transfer. However, those types of heat transfer, which may be unavoidable and may be incorporated into sizing of the components, are generally not part of the heat-exchange communication referred to herein.

The EGHR heat exchanger 18 is shown in concentric-flow configuration, such that both fluids (exhaust gases and coolant) flow substantially parallel to each other and to the length of the heat exchanger. Alternatively, the EGHR heat exchanger 18 may be configured with cross-flow, such that one of the fluids flows substantially perpendicularly to the other fluid. The flow orientation of this heat exchanger, and others used within the heat management system 10, will depend upon the available space and geometry of the vehicle, upon the heat transfer needs of the specific elements to which each heat exchanger is connected, and upon the type of fluids used in each heat exchanger. The specific configurations of the heat exchangers shown in the figures and description are not intended to be limiting.

The engine water circuit 22 is supplied with pressurized coolant by a primary pump 23 incorporated with the engine 12. The primary pump 23 may be a mechanical pump driven by rotation of the engine 12, or may be an electrically-operated pump driven and varied independently of the engine 12. Depending upon the operating conditions of the heat management system 10, the coolant in the engine water circuit 22 may be heated by the exhaust gases from the engine 12. A transmission water circuit 24 is selectively connected to the engine water circuit 22 by a two-way valve 26, which allows heat-flow or heat-exchange communication between the transmission water circuit 24 and the engine water circuit 22.

The two-way valve 26 is configured to be selectively controlled or set to one of an engine position and a transmission position. The engine position of the two-way valve 26 allows heat-exchange communication between the EGHR heat exchanger 18 and the engine 12. The transmission position allows heat-exchange communication between the EGHR heat exchanger 18 and both the transmission 14 and the engine 12. When the two-way valve 26 is in the transmission position, the transmission water circuit 24 is supplied with coolant or water from the engine water circuit 22 by the primary pump 23, if the primary pump 23 is operating.

A transmission oil circuit 28 circulates lubricating and cooling oil from the transmission 14. The transmission oil circuit 28 is shown schematically in FIG. 1, and is shown in detail in FIG. 2. The two-way valve 26 may be electrically operated, fluid operated (such as by a pilot valve), or operated in any suitable manner to move between the engine position and the transmission position.

Controlling the two-way valve 26 may include providing an engine signal configured to place the two-way valve 26 into the engine position. The engine signal may be a specific control signal, or may be the power supply to the two-way valve 26, such that when ever the two-way valve 26 is powered it is set to the engine position. Therefore, the two-way valve 26 is set to the transmission position whenever the engine signal is not provided, such that the two-way valve 26 is configured to default to the transmission position when unpowered.

The exact boundaries and paths of the engine water circuit 22 and the transmission water circuit 24 may vary slightly. The engine water circuit 22 provides communication between the engine 12 and the EGHR heat exchanger 18. The transmission water circuit 24 provides communication between the engine water circuit 22 and the transmission oil circuit 28. The two-way valve 26 has three ports: a first port or inlet port brings water or coolant in from the heater core 30 or directly from the coolant outlet of the engine 12; a second port links the inlet flow to the engine water circuit 22 such that only the engine water circuit 22 has flow; and a third port links the inlet flow to the transmission water circuit 24.

In addition to the EGHR heat exchanger 18, the heat management system 10 includes other heat exchangers or radiators. A heater core 30 allows heat to be transferred from the coolant or water leaving the engine 12 to the cabin (passenger compartment) of the vehicle. An engine radiator 32 is a water-to-air heat exchanger configured to selectively dissipate heat from the engine 12 to ambient air flowing through the engine radiator 32.

An engine thermostat 33 may be used to control flow of coolant from the engine 12 through the engine radiator 32. The engine thermostat 33 is configured to be set to one of an open position and a closed position. The open position allows heat-exchange communication between the engine 12 and the engine radiator 32 and the closed position blocks heat-exchange communication between the engine 12 and the engine radiator 32.

The engine thermostat 33 is configured to move or switch between the open and closed positions based upon an engine thermostat temperature. If the monitored engine water temperature is above the engine thermostat temperature, the engine thermostat 33 is set to the open position. Actuation of the engine thermostat 33 may be controlled mechanically, such as with a wax motor or other thermal actuator, or electronically, such as by a signal from the control system 20.

A transmission radiator 34 (shown in FIG. 2) is an oil-to-air heat exchanger configured to selectively dissipate heat from the transmission oil circuit 28 of the transmission 14 to ambient air flowing through or passed the transmission radiator 34. While the engine radiator 32 and the transmission radiator 34 are shown schematically in different locations, in many applications of the heat management system 10, the engine radiator 32 and transmission radiator 34 may be placed near each other at an area of high airflow into the underhood area of the vehicle. However, the engine radiator 32 and the transmission radiator 34 may be located elsewhere in the vehicle. As used herein, heat exchanger may refer to myriad different devices for exchanging heat energy between two mediums or two systems having similar mediums.

The actual direction of flow of heat energy between any sides of a heat exchanger is controlled by temperature differential across the specific heat exchanger. For example, if the engine 12 were very cold and the thermostat allowed circulation through the engine radiator 32 on a very hot day, the engine radiator 32 would warm the coolant until it reached (approximately) the ambient temperature and would then cool the engine coolant when the coolant temperature exceeded the ambient temperature.

An oil-to-water heat exchanger 36 allows heat-exchange communication between the transmission oil circuit 28 of the transmission 14 and the transmission water circuit 24. The oil-to-water heat exchanger 36 allows heat to be transferred from the transmission water circuit 24 to the transmission oil circuit 28 in order to selectively warm the transmission 14. Warming the transmission 14 may improve efficiency by altering slip or spin losses, viscosity, or other low temperature related losses.

An auxiliary pump 38 is disposed within the engine water circuit 22. The auxiliary pump 38 may be used to add pressure and increase flow through the engine water circuit 22 and, selectively, the transmission water circuit 24 when the need arises. Furthermore, when the engine 12 is turned off or un-fueled by the hybrid vehicle controls (not shown separately) the auxiliary pump 38 may be used as the main pressure source for the engine water circuit 22 and the transmission water circuit 24. Therefore, the auxiliary pump 38 may be used to supplement the primary pump 23 incorporated into the engine 12, may be used as the only pump when the engine 12 and the primary pump 23 are not operating, or may be used as the sole pump for the engine water circuit 22 and the transmission water circuit 24 in configurations where no primary pump 23 is included.

An EGHR bypass valve 42 controls flow of exhaust gases through the EGHR heat exchanger 18. The EGHR bypass valve 42 is shown in its non-bypass position, which allows flow of exhaust gases through the EGHR heat exchanger 18 and allows heat-exchange communication between the exhaust gases and the engine water circuit 22. When the EGHR bypass valve 42 is switched, flipped, or otherwise actuated to a bypass position—shown in FIG. 1 as a dashed line and labeled as element 43—exhaust gases leaving the engine 12 are not allowed to pass through the EGHR heat exchanger 18.

The EGHR bypass valve 42 may be controlled by a solenoid, a mechanical thermostat, a wax motor, vacuum actuator, or other suitable controls, and may be switched between the non-bypass position and the bypass position at varying temperatures and conditions. The EGHR bypass valve 42 may be controlled based upon the monitored engine temperature or based upon the temperature of the coolant flowing through the EGHR heat exchanger 18. For example, and without limitation, the EGHR bypass valve 42 may be a wax motor driven by coolant temperatures of seventy-two degrees Celsius or greater in the engine water circuit 22. The set-point temperature for the EGHR bypass valve 42, and other settings within the heat management system 10, is exemplary and illustrative only. The specific values for set points will be determined based upon the specific configuration of the heat management system 10 and the vehicle into which it is incorporated.

A transmission thermostat 44 controls flow between the transmission oil circuit 28, the transmission radiator 34, and the oil-to-water heat exchanger 36. The transmission thermostat 44 is a three-port, two-way valve, and will be discussed in more detail below.

An ambient air sensor 46 monitors the temperature of the ambient air around (and flowing through) the vehicle and is in communication with the control system 20. Either the control system 20 or the ambient air sensor 46 compares the monitored ambient air temperature to one or more calibrated temperatures, such as a calibrated predetermined cold ambient temperature. Any calibrated temperatures referred to herein may be determined through testing or modeling of the heat management system 10 and the vehicle. Furthermore, the calibrated temperatures may be altered throughout the lifetime of the vehicle based upon the lifecycle of the vehicle or components thereof or based upon learned operating characteristics of the vehicle of having the heat management system 10. The values given for the calibrated temperatures are illustrative and exemplary only, and the values are not intended to limit the scope of the invention unless included in the claims defining the invention.

As shown in FIG. 2, the transmission thermostat 44 has three ports in use. An inlet port 48 is in fluid-flow communication with an oil outlet 50 of the transmission 14. A first outlet port 52 is in fluid-flow communication with the oil-to-water heat exchanger 36, which then returns to the transmission 14 through a t-port or combined flow inlet. A second outlet port 54 is in fluid-flow communication with the transmission radiator 34, which also returns oil to the transmission 14 through the t-port inlet. However, for modularity purposes, the transmission thermostat 44 may have additional ports that are blocked, plugged, or otherwise disabled (such that it may have four or more ports but functions as a three-port valve).

FIGS. 1 and 2 show that the oil-to-water heat exchanger 36 is in reverse-flow configuration, such that each end of the heat exchanger has one fluid entering and one fluid exiting. Alternatively, the oil-to-water heat exchanger 36 may be configured with forward flow, such that one end of the heat exchanger has both fluids entering and the other end of the heat exchanger has both fluids exiting. Cross-flow configurations may also be used for the oil-to-water heat exchanger 36.

The transmission thermostat 44 is configured to be set to one of an EGHR position and a radiator position. The EGHR position (illustrated with dashed flow arrows in FIG. 2) allows heat-exchange communication between the transmission 14 and the oil-to-water heat exchanger 36. The radiator position (illustrated with solid flow arrows in FIG. 2) allows heat-exchange communication between the transmission 14 and the transmission radiator 34 and blocks heat-exchange communication between the transmission 14 and the oil-to-water heat exchanger 36. Alternatively stated, the EGHR position allows fluid-flow communication between the inlet port 48 and the first outlet port 52, and the radiator position allows fluid-flow communication between the inlet port 48 and the second outlet port 54.

The transmission oil temperature is monitored by either the control system 20 or the transmission thermostat 44. The monitored transmission oil temperature is compared to a transmission thermostat temperature. If the monitored transmission oil temperature is above the transmission thermostat temperature, the transmission thermostat 44 is set to the radiator position, but if the monitored transmission oil temperature is below the transmission thermostat temperature, the transmission thermostat 44 is set to the EGHR position.

The transmission thermostat 44 is configured to move or switch between the EGHR and radiator positions based upon the monitored thermostat temperature. Actuation of the transmission thermostat 44 may be controlled mechanically; such as with a wax motor or other thermal actuator; electronically, such as by a signal from the control system 20; or a combination of both, such as with a wax motor and a resistive heater capable of altering the temperature of the wax motor relative to the oil in the transmission 14.

When the transmission thermostat 44 is in the radiator position little or no heat transfer occurs between the transmission 14 and the oil-to-water heat exchanger 36. However, the EGHR position allows heat to be transferred from the oil-to-water heat exchanger 36, which may be receiving heat from the EGHR heat exchanger 18, depending upon the position of the two-way valve 26. For example, and without limitation, the transmission thermostat 44 may be configured to move between the EGHR position and the radiator position by oil temperatures greater than eighty-two degrees Celsius or greater than ninety-two degrees Celsius in the transmission oil circuit 28, depending upon the size of the transmission radiator 34.

Flow arrows are shown in FIG. 1 to illustrate the path and direction of flow through some areas and components of the heat management system 10 during specific operating modes. The EGHR bypass valve 42 is shown in the non-bypass modes so that exhaust gases are flowing through the EGHR heat exchanger 18. The two-way valve 26 is shown in the transmission position so that the transmission water circuit 24 is in fluid communication with the engine water circuit 22. When the two-way valve 26 is in the transmission position the oil-to-water heat exchanger 36 allows heat-exchange communication between the engine water circuit 22 (via the transmission water circuit 24) and the transmission oil circuit 28, but only if the transmission thermostat 44 is in the EGHR position and is allowing oil to flow through the oil-to-water heat exchanger 36.

Figure 3:
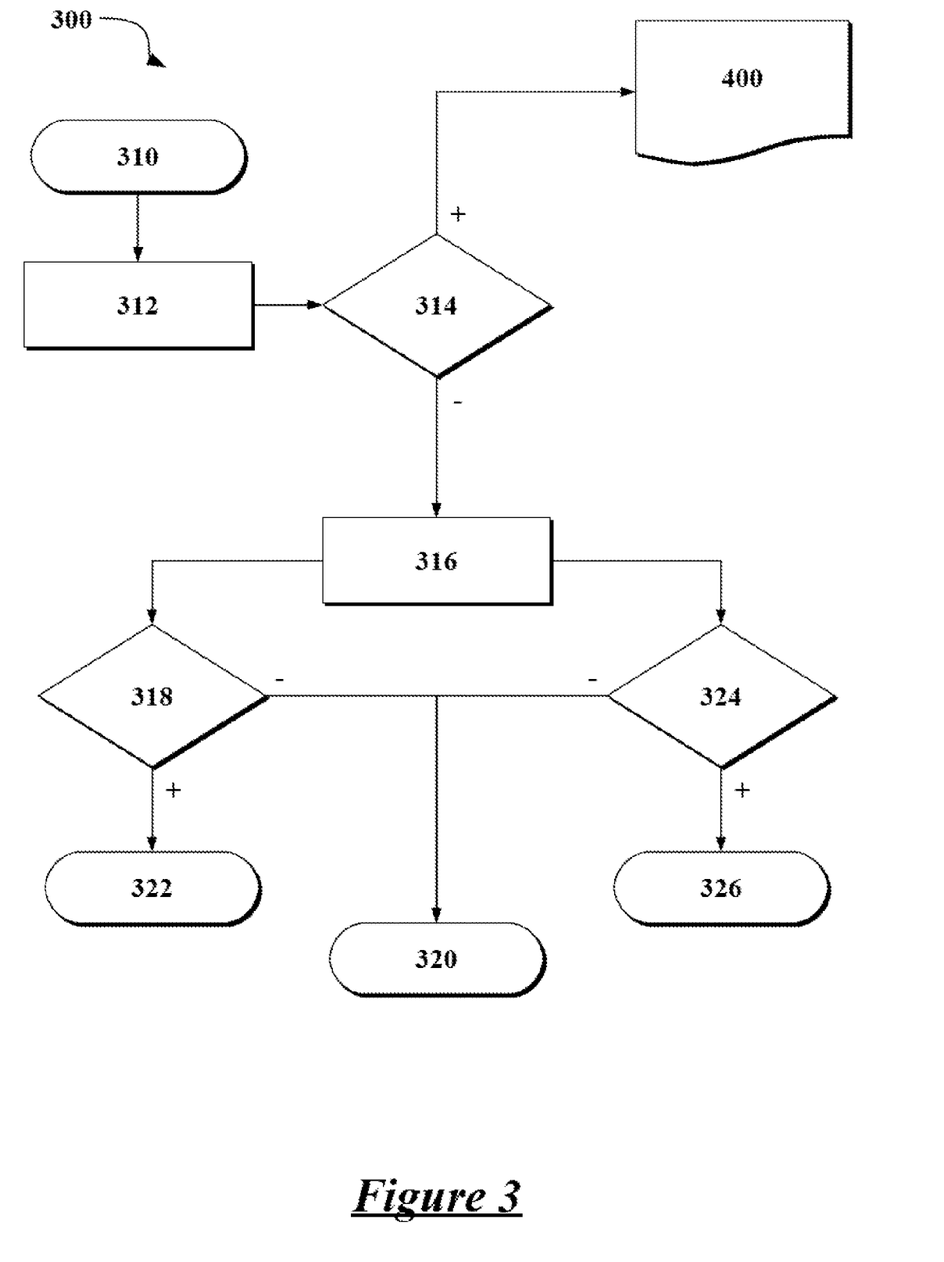
FIG. 3 is a schematic flow chart diagram of an algorithm or method for controlling an EGHR system, such as that shown in FIG. 1.
Figure 4:
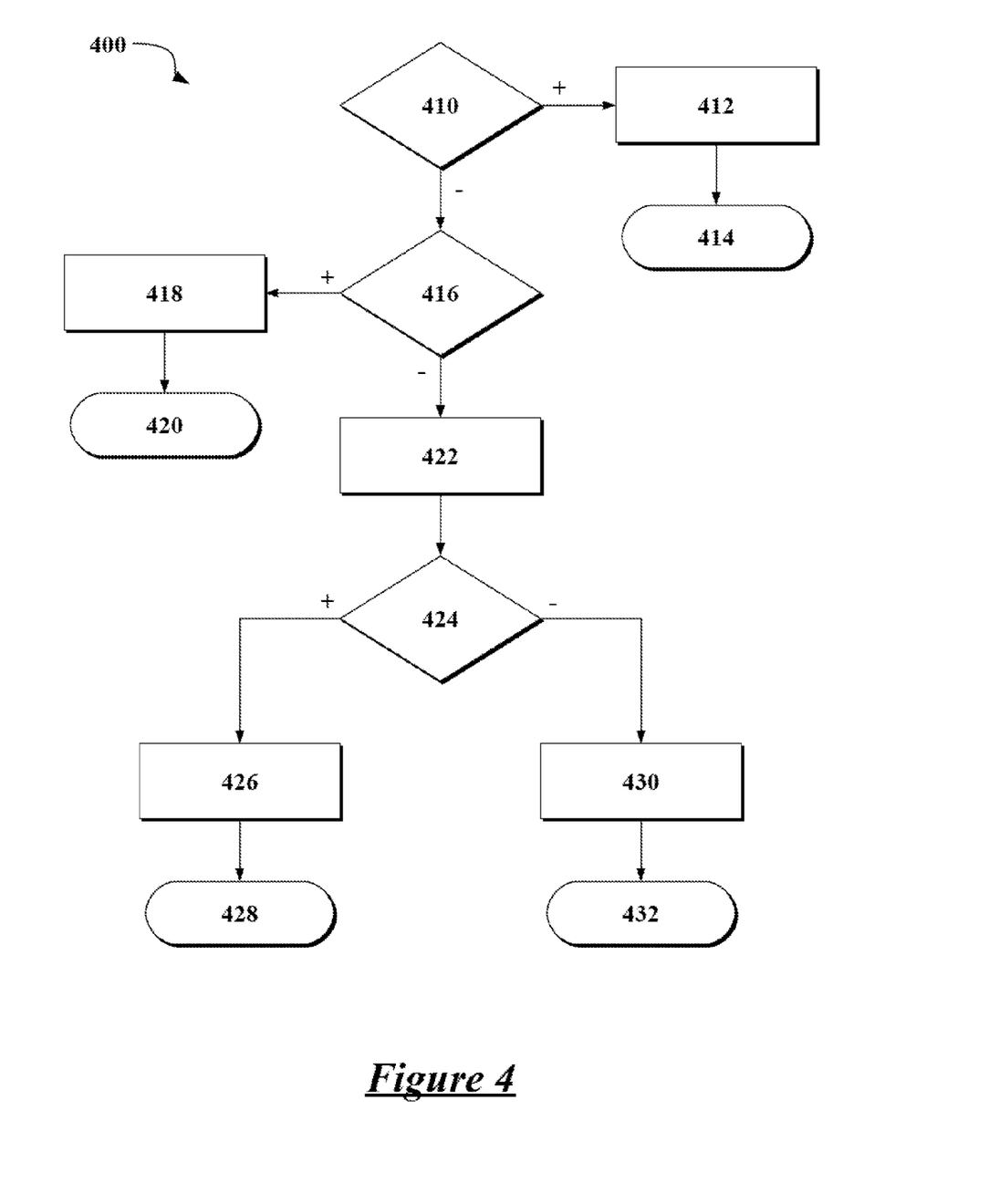
FIG. 4 is a schematic flow chart of another subroutine of the method shown in FIG. 3, showing portions of the method for predetermined cold ambient temperatures.

Referring now to FIG. 3 and FIG. 4, and with continued reference to FIGS. 1 and 2, there are shown schematic flow chart diagrams of an algorithm or method 300 for controlling exhaust gas heat recovery and distribution in vehicles, such as those using the heat management system 10 shown in FIG. 1. FIG. 3 shows a high-level diagram of the method 300. FIG. 4 shows a cold sub-routine 400 of the method 300 occurring during predetermined cold ambient temperatures.

The exact order of the steps of the algorithm or method 300 shown in FIGS. 3 and 4 is not required. Steps may be reordered, steps may be omitted, and additional steps may be included. Furthermore, the method 300 may be a portion or sub-routine of another algorithm or method.

For illustrative purposes, the method 300 may be described with reference to the elements and components shown and described in relation to FIG. 1 and may be executed by the control system 20. However, other components may be used to practice the method 300 and the invention defined in the appended claims. Any of the steps may be executed by multiple components within the control system 20.

Step 310: Start.

The method 300 may begin at a start or initialization step, during which time the method 300 is monitoring operating conditions of the vehicle and of the heat management system 10. Initiation may occur in response to the vehicle operator inserting the ignition key or in response to specific conditions being met, such as in response to a negative torque request (braking or deceleration request) from the driver or cruise control module combined with a predicted or commanded downshift. Alternatively, the method 300 may be running constantly or looping constantly whenever the vehicle is in use.

Step 312: Determine Ambient, Transmission, and Engine Temperatures.

The method 300 includes monitoring or determining temperatures of different components or conditions. An ambient air temperature is monitored, such as with the ambient air sensor 46. An engine water temperature is also monitored. The engine water temperature may be determined from within the engine 12, at the entrance to the engine water circuit 22, from another location of the engine water circuit 22, or at the engine thermostat 33. A transmission oil temperature is also monitored. The transmission oil temperature may be determined from within the transmission 14, at the entrance to the transmission oil circuit 28, or from another location.

Step 314: Ambient Air Below Calibrated Cold Temperature?

The method 300 compares the monitored ambient air temperature to the calibrated predetermined cold ambient temperature to determine the ambient air temperature range. For example, and without limitation, the calibrated predetermined cold ambient temperature may be any monitored ambient temperature below eight degrees Celsius.

If the method 300 determines that the temperature is within the cold range, the method 300 proceeds to the cold sub-routine 400. If the method 300 determines that the temperature is not within the cold range, the method 300 proceeds to set the heat management system 10 for non-cold operations.

Step 316: Valve Set to Transmission Position.

Whenever the ambient temperature is above the cold ambient range, the two-way valve 26 is set to the transmission position. The two-way valve 26 may be controlled by a dedicated control signal or may be configured to be in the engine position whenever the two-way valve 26 receives power. Therefore, placing the two-way valve 26 in the transmission position may occur as a result of not powering the two-way valve 26 whenever the ambient temperature is above the calibrated predetermined cold ambient temperature. When the two-way valve 26 is in the transmission position, the engine thermostat 33 and the transmission thermostat 44 still control the temperatures of the engine 12 and the transmission 14, respectively.

Step 318: Transmission Reached Transmission Thermostat Temperature?

The transmission thermostat 44 is controlled based upon comparison between the transmission thermostat temperature and the temperature of the transmission 14 or the oil in the transmission 14. The transmission thermostat 44 will be placed into either the EGHR position or the radiator position.

Step 320: EGHR Position; End.

If the transmission oil has not reached the transmission thermostat temperature, the transmission thermostat 44 will switch to the EGHR position. When the transmission thermostat 44 is allowing oil flow through the oil-to-water heat exchanger 36, any heat being transferred from the EGHR heat exchanger 18 or from the engine 12 will be transferred to the transmission 14 through the transmission oil circuit 28 if the temperature of the oil in the transmission 14 is lower than the temperature of the transmission water circuit 24. This heat may increase the temperature of the transmission 14, which may reduce slip loss therein.

The EGHR position may be configured as the default position of the transmission thermostat 44 if it is electrically operated. Ending the method 300, at this point or others, may include looping back to the start 310, or waiting until the method 300 is called to run again. Furthermore, the method 300 may be configured such that any specific end state or mode continues for a predetermined amount of time before the method 300 loops or iterates again.

Step 322: Radiator Position; End.

If the transmission oil has reached the transmission thermostat temperature, the transmission thermostat 44 will switch to the radiator position. Moving the transmission thermostat 44 to the radiator position will allow oil to circulate through the transmission radiator 34 to cool the oil in the transmission 14.

Step 324: Engine Reached Engine Thermostat Temperature?

The engine thermostat 33 is controlled based upon comparison between the engine thermostat temperature and the temperature of the engine 12 or the water in the engine 12. The engine thermostat 33 will be placed into either the open position or the closed position.

Step 320: Closed Position; End.

If the engine 12 has not reached the engine thermostat temperature, the engine thermostat 33 will be placed in the closed position. When the engine thermostat 33 is not allowing water to flow through the engine radiator 32, any heat being transferred from the EGHR heat exchanger 18 to the transmission water circuit 24 will stay in the engine 12. This heat may increase the temperature of the engine 12, which may alter the operating characteristics of the engine 12. For example, increasing the temperature of a relatively-cold engine 12 may reduce friction from engine oil or may improve combustion of the fuel.

Step 326: Open Position; End.

If the engine 12 has reached the engine thermostat temperature, the engine thermostat 33 will switch to the open position. Moving the engine thermostat 33 to the open position will allow engine water to circulate through the engine radiator 32 to cool the engine 12.

Cold Sub-Routine 400.

Referring now to FIG. 4, and with continued reference to FIGS. 1-3, there is shown a schematic flow chart diagram of the cold sub-routine 400. The cold sub-routine 400 is a portion of the method 300 shown in FIG. 3 and is represented in FIG. 3 as a part of the block denoted by the number 400. The steps shown in the flow chart diagram of FIG. 4 may be only a portion of the cold sub-routine 400, such that the method 300 may include further steps within the cold sub-routine 400. The cold sub-routine 400 may be called-up whenever the method 300 determines that the ambient temperature is below the calibrated predetermined cold ambient temperature.

During the cold sub-routine 400, the engine thermostat 33 and the transmission thermostat 44 will be operating as described herein. However, for illustrative purposes the operating states and logic of the engine thermostat 33 and the transmission thermostat 44 are not shown in FIG. 4.

Step 410: Engine Temperature Less than Engine Target Temperature?

If the monitored ambient air temperature is below the calibrated predetermined cold ambient temperature, the method 300 includes comparing the monitored engine water temperature to a engine target temperature. The engine target temperature may be the same as or different from the transmission target temperature, such that both may be approximately seventy degrees Celsius.

Step 412: Engine-Warming Mode.

If the method 300 determines that the monitored engine water temperature is below the engine target temperature, the method 300 proceeds to an engine-warming mode for the heat management system 10. The method 300 places the heat management system 10 into the engine-warming mode to increase the temperature of the engine 12—if any heat is available from the exhaust gases—through the EGHR heat exchanger 18.

Step 414: Valve Set to Engine Position.

Executing the engine-warming mode includes controlling or setting the two-way valve 26 to the engine position. The control system 20 may actuate the two-way valve 26 based upon the determination of the method 300. Furthermore, the EGHR bypass valve 42 is calibrated to remain in the non-bypass position, because the temperature of the coolant passing through the engine water circuit 22 is insufficient to actuate or trigger the EGHR bypass valve 42.

When the heat management system 10 is in the engine-warming mode, hot exhaust gases travel through the exhaust system 16 and are directed through the EGHR heat exchanger 18 by the EGHR bypass valve 42. Coolant leaves the engine 12, passes through the heater core 30, and the two-way valve 26 prevents flow of the coolant through the transmission water circuit 24. The coolant is circulated only through the engine water circuit 22. The exhaust gases transfer heat to the coolant in the engine water circuit 22, which returns to warm the engine 12.

Step 416: Engine Producing Positive Torque?

If the method 300 determines that the monitored engine water temperature is not below the engine target temperature, the method 300 proceeds to monitoring for an auto-stop mode. Auto-stop mode occurs when vehicles shut down, power off, or cut fuel to the engine 12. Alternatively stated, auto-stop mode occurs when the engine 12 is not producing positive torque.

Step 418: Transmission-Warming Mode.

If the engine 12 is not in auto-stop mode, such that the engine 12 is producing positive torque, then the method 300 will control the heat management system 10 to the transmission-warming mode. In the transmission-warming mode, during predetermined cold ambient temperatures, heat from the engine 12, heat from the EGHR heat exchanger 18, or heat from both, is transferred through the oil-to-water heat exchanger 36 to the transmission oil circuit 28 and the transmission 14.

Step 420: Valve Set to Transmission Position.

When in the transmission-warming mode, the method 300 sets the two-way valve 26 to the transmission position. When the two-way valve 26 is in the transmission position, coolant is directed through the transmission water circuit 24 and the oil-to-water heat exchanger 36 before proceeding to the EGHR heat exchanger 18 and back to the engine 12. Any time that the heat management system 10 is in the transmission-warming mode, the two-way valve 26 will be set to the transmission position.

During the transmission-warming mode, heat from the engine 12 will be transferred through the oil-to-water heat exchanger 36 to the transmission 14, if the transmission thermostat 44 is in the EGHR position and is allowing flow of oil through the oil-to-water heat exchanger 36. Furthermore, heat from the exhaust gases will transfer from the EGHR heat exchanger 18 to the engine water circuit 22 and eventually to the transmission 14.

Step 422: Auto-Stop Mode.

If the engine 12 is in the auto-stop mode, the engine 12 is not producing torque and is likely not producing heat. Furthermore, during the auto-stop mode, the auxiliary pump 38 will be turned on to provide pressure to the engine water circuit 22 and, if connected by the two-way valve 26, to the transmission water circuit 24. Note that in powertrains without the primary pump 23, the auxiliary pump 38 may have already be running, but may need to increase the pressure and flow provided.

Step 424: Transmission Temperature less than Calibrated Second Temperature?

After determining that the engine 12 is in auto-stop mode, the method 300 then includes comparing the monitored transmission oil temperature to a transmission target temperature. For example, and without limitation, the transmission target temperature may be approximately seventy degrees Celsius.

Step 426: Transmission-Warming Mode.

If the engine 12 is in auto-stop mode and the monitored transmission oil temperature is below the transmission target temperature, then the method 300 will again control the heat management system 10 to the transmission-warming mode. In the transmission-warming mode, during predetermined cold ambient temperatures, heat from the engine 12, residual heat from the EGHR heat exchanger 18, or heat from both, is transferred through the oil-to-water heat exchanger 36 to the transmission oil circuit 28 and the transmission 14.

Step 428: Valve Set to Transmission Position.

When in the transmission-warming mode, the method 300 sets the two-way valve 26 to the transmission position. When the two-way valve 26 is in the transmission position, coolant passes through the heater core 30 and is then directed through the transmission water circuit 24 and the oil-to-water heat exchanger 36 before proceeding to the EGHR heat exchanger 18 and back to the engine 12.

During the transmission-warming mode, heat from the engine 12 will be transferred through the oil-to-water heat exchanger 36 to the transmission 14, if the transmission thermostat 44 is allowing flow of oil through the oil-to-water heat exchanger 36. Furthermore, heat from the exhaust gases left in the EGHR heat exchanger 18 will transfer from the EGHR heat exchanger 18 to the engine water circuit 22 and eventually to the transmission 14.

Step 430: Engine-Warming Mode.

If the method 300 determines that the engine 12 is in the auto-stop mode (not producing torque) and if the monitored transmission oil temperature is not below the transmission target temperature, the method 300 proceeds to the engine-warming mode for the heat management system 10. The method 300 places the heat management system 10 into the engine-warming mode to increase the temperature of the engine 12—if any heat is available from the exhaust gases—through the EGHR heat exchanger 18. During auto-stop mode, additional heat in the transmission 14 may be used as additional thermal mass to delay the next engine-on event if the transmission 14 is above the transmission target temperature.

Step 432: Valve Set to Engine Position.

Executing the engine-warming mode includes controlling or setting the two-way valve 26 to the engine position. When the heat management system 10 is in the engine-warming mode during an auto stop, residual heat from hot exhaust gases is directed through the EGHR heat exchanger 18 by the EGHR bypass valve 42. Coolant leaves the engine 12, passes through the heater core 30, and the two-way valve 26 prevents flow of the coolant through the transmission water circuit 24. The exhaust gases transfer heat to the coolant in the engine water circuit 22, which returns to warm the engine 12.

Figure 5:
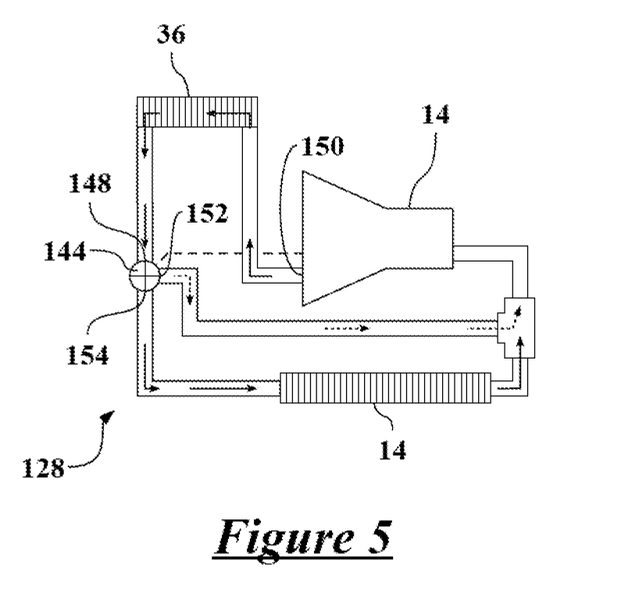
FIG. 5 is a schematic diagram of an alternatively-configured transmission oil circuit for the EGHR system shown in FIG. 1, which is also usable with the method shown in FIGS. 3 and 4.

Referring now to FIG. 5, and with continued reference to FIGS. 1-4, there is shown a schematic diagram of an alternatively-configured transmission oil circuit 128 for the heat management system 10 shown in FIG. 1, which is also usable with the method 300 shown in FIGS. 3 and 4. FIG. 5 shows a detail view of the transmission oil circuit 128, which may be substituted for the transmission oil circuit 28 shown in FIGS. 1 and 2 and used with the heat management system 10 shown in FIG. 1.

A transmission thermostat 144 controls flow between the transmission oil circuit 128, a transmission radiator 34, and the oil-to-water heat exchanger 36. Similar the transmission thermostat 44 shown in FIG. 2, the transmission thermostat 144 is a three-port, two-way valve 26.

As shown in FIG. 5, the transmission thermostat 144 has three ports in use. An inlet port 148 is in fluid-flow communication with an oil outlet 150 via the oil-to-water heat exchanger 36 of the transmission 14. A first outlet port 152 returns to the transmission 14 through a t-port or combined flow return. A second outlet port 154 is in fluid-flow communication with the transmission radiator 34, which also returns oil to the transmission 14 after transferring heat to the ambient air passing through the transmission radiator 34. The transmission thermostat 144 may have additional ports that are blocked, plugged, or otherwise disabled (such that it may have four or more ports but functions as a three-port valve).

The transmission thermostat 144 is configured to be set to one of an EGHR position and a radiator position. The EGHR position (illustrated with dashed flow arrows in FIG. 5) allows heat-exchange communication between the transmission 14 and the oil-to-water heat exchanger 36, by returning oil flow straight from the oil-to-water heat exchanger 36 to the transmission 14. The radiator position (illustrated with solid flow arrows in FIG. 5) allows heat-exchange communication between the transmission 14 and the transmission radiator 34 and limits heat-exchange communication between the transmission 14 and the oil-to-water heat exchanger 36.

The radiator position limits heat-exchange communication between the transmission 14 and the oil-to-water heat exchanger 36 by first dispersing heat from the oil-to-water heat exchanger 36 through the transmission radiator 34 before returning the oil to the transmission 14. Alternatively stated, the EGHR position allows fluid-flow communication between the inlet port 148 and the first outlet port 152, and the radiator position allows fluid-flow communication between the inlet port 148 and the second outlet port 154.

FIGS. 1 and 5 show that the transmission oil circuit 128 of FIG. 5 is configured with the oil-to-water heat exchanger 36 in forward-flow configuration, such that one end of the heat exchanger has both fluids entering and the other end of the heat exchanger has both fluids exiting. Alternatively, the oil-to-water heat exchanger 36 may be configured with reverse flow, such that each end of the heat exchanger has one fluid entering and one fluid exiting. Cross-flow configurations may also be used for the oil-to-water heat exchanger 36 of either FIG. 5 or FIG. 2.

The transmission oil temperature is monitored by either the control system 20 or the transmission thermostat 144. The monitored transmission oil temperature is again compared to the transmission thermostat temperature. If the monitored transmission oil temperature is above the transmission thermostat temperature, the transmission thermostat 144 is set to the radiator position, but if the monitored transmission oil temperature is below the transmission thermostat temperature, the transmission thermostat 144 is set to the EGHR position.

The transmission thermostat 144 is configured to move or switch between the EGHR and radiator positions based upon the monitored thermostat temperature. Actuation of the transmission thermostat 144 may be controlled mechanically; such as with a wax motor or other thermal actuator; electronically, such as by a signal from the control system 20; or a combination of both, such as with a wax motor and a resistive heater capable of altering the temperature of the wax motor relative to the oil in the transmission 14.

When the transmission thermostat 144 is in the radiator position comparatively less heat transfer occurs between the transmission 14 and the oil-to-water heat exchanger 36. However, the EGHR position allows heat to be transferred directly from the oil-to-water heat exchanger 36, which may be receiving heat from the EGHR heat exchanger 18, depending upon the position of the two-way valve 26. For example, and without limitation, the transmission thermostat 144 may be configured to move between the EGHR position and the radiator position by oil temperatures greater than eighty-two degrees Celsius or greater than ninety-two degrees Celsius in the transmission oil circuit 128, depending upon the size of the transmission radiator 34.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of operating a vehicle including an engine, a transmission, an exhaust gas heat recovery (EGHR) heat exchanger, an oil-to-water heat exchanger providing selective heat-exchange communication between the engine and transmission, and a transmission radiator, the method comprising:

controlling a two-way valve, wherein the two-way valve is configured to be set to one of an engine position and a transmission position, wherein the engine position allows heat-exchange communication between the EGHR heat exchanger and the engine and does not allow heat-exchange communication between the EGHR heat exchanger and the oil-to-water heat exchanger, and the transmission position allows heat-exchange communication between the EGHR heat exchanger, the oil-to-water heat exchanger, and the engine;
monitoring an ambient air temperature;
comparing the monitored ambient air temperature to a predetermined cold ambient temperature;
if the monitored ambient air temperature is greater than the predetermined cold ambient temperature, setting the two-way valve to the transmission position;
controlling a transmission thermostat, wherein the transmission thermostat is configured to be set to one of an EGHR position and a radiator position, wherein the EGHR position allows heat-exchange communication between the transmission and the oil-to-water heat exchanger, and the radiator position allows heat-exchange communication between the transmission and the transmission radiator and blocks heat-exchange communication between the transmission and the oil-to-water heat exchanger, and wherein the transmission thermostat has three ports:
an inlet port in fluid-flow communication with an oil outlet of the transmission,
a first outlet port in fluid-flow communication with the oil-to-water heat exchanger, and
a second outlet port in fluid-flow communication with the transmission radiator, wherein the EGHR position allows fluid-flow communication between the inlet port and the first outlet port and the radiator position allows fluid-flow communication between the inlet port and the second outlet port;
monitoring a transmission oil temperature;
comparing the monitored transmission oil temperature to a transmission thermostat temperature;
if the monitored transmission oil temperature is above the transmission thermostat temperature, setting the transmission thermostat to the radiator position;
controlling an engine thermostat, wherein the engine thermostat is configured to be set to one of an open position and a closed position, wherein the open position allows heat-exchange communication between the engine and the engine radiator and the closed position blocks heat-exchange communication between the engine and the engine radiator;
monitoring an engine water temperature;
comparing the monitored engine water temperature to an engine thermostat temperature;
if the monitored engine water temperature is above the engine thermostat temperature, setting the engine thermostat to the open position;
wherein controlling the two-way valve includes providing an engine signal configured to place the two-way valve into the engine position;
wherein the transmission thermostat temperature is within five degrees Celsius of the engine thermostat temperature;
if the monitored ambient air temperature is below the predetermined cold ambient temperature, comparing the monitored engine water temperature to an engine target temperature;
if the monitored engine water temperature is below the engine target temperature, setting the two-way valve to the engine position;
if the monitored engine water temperature is above the engine target temperature, monitoring for an auto-stop mode, wherein the auto-stop mode occurs when the engine is not producing positive torque; and
if the engine is not in the auto-stop mode, setting the two-way valve to the transmission position.

2. The method of claim 1, further comprising:
if the engine is in the auto-stop mode, comparing the monitored transmission oil temperature to a transmission target temperature;
if the monitored transmission oil temperature is above the transmission target temperature, setting the two-way valve to the engine position; and
if the monitored transmission oil temperature is below the transmission target temperature, setting the two-way valve to the transmission position.

3. The method of claim 2, wherein the two-way valve is set to the transmission position whenever the engine signal is not provided, such that the two-way valve is configured to default to the transmission position when unpowered.

4. A method of operating a vehicle including an engine, a transmission, an exhaust gas heat recovery (EGHR) heat exchanger, and an oil-to-water heat exchanger providing selective heat-exchange communication between the engine and transmission, the method comprising:
controlling a two-way valve, wherein the two-way valve is configured to be set to one of an engine position and a transmission position in response to an engine signal which is configured to place the two-way valve into the engine position, wherein the engine position allows heat-exchange communication between the EGHR heat exchanger and the engine and does not allow heat-exchange communication between the EGHR heat exchanger and the oil-to-water heat exchanger, and the transmission position allows heat-exchange communication between the EGHR heat exchanger, the oil-to-water heat exchanger, and the engine;
monitoring an ambient air temperature;
comparing the monitored ambient air temperature to a predetermined cold ambient temperature; and
if the monitored ambient air temperature is greater than the predetermined cold ambient temperature, setting the two-way valve to the transmission position, wherein the two-way valve is set to the transmission position whenever the engine signal is not provided, such that the two-way valve is configured to default to the transmission position when unpowered; and
if the monitored ambient air temperature is below the predetermined cold ambient temperature, comparing the monitored engine water temperature to an engine target temperature:
if the monitored engine water temperature is below the engine target temperature, setting the two-way valve to the engine position, and
if the monitored engine water temperature is above the engine target temperature, monitoring for an auto-stop mode, wherein the auto-stop mode occurs when the engine is not producing positive torque:
if the engine is not in the auto-stop mode, setting the two-way valve to the transmission position, and
if the engine is in the auto-stop mode, comparing the monitored transmission oil temperature to a transmission target temperature:
if the monitored transmission oil temperature is above the transmission target temperature, setting the two-way valve to the engine position, and
if the monitored transmission oil temperature is below the transmission target temperature, setting the two-way valve to the transmission position.

5. The method of claim 4, wherein the vehicle further includes a transmission radiator, and further comprising:
controlling a transmission thermostat, wherein the transmission thermostat is configured to be set to one of an EGHR position and a radiator position, wherein the EGHR position allows heat-exchange communication between the transmission and the oil-to-water heat exchanger, and the radiator position allows heat-exchange communication between the transmission and the transmission radiator and blocks heat-exchange communication between the transmission and the oil-to-water heat exchanger;
monitoring a transmission oil temperature;
comparing the monitored transmission oil temperature to a transmission thermostat temperature; and
if the monitored transmission oil temperature is above the transmission thermostat temperature, setting the transmission thermostat to the radiator position.

6. The method of claim 5,
wherein the transmission thermostat has three ports:
an inlet port in fluid-flow communication with an oil outlet of the transmission,
a first outlet port in fluid-flow communication with the oil-to-water heat exchanger, and
a second outlet port in fluid-flow communication with the transmission radiator; and
wherein the EGHR position allows fluid-flow communication between the inlet port and the first outlet port and the radiator position allows fluid-flow communication between the inlet port and the second outlet port.

7. The method of claim 6,
wherein the transmission thermostat has three ports:
an inlet port in fluid-flow communication with the oil-to-water heat exchanger and an oil outlet of the transmission,
a first outlet port in fluid-flow communication with the transmission, and
a second outlet port in fluid-flow communication with the transmission radiator; and
wherein the EGHR position allows fluid-flow communication between the inlet port and the first outlet port and the radiator position allows fluid-flow communication between the inlet port and the second outlet port.

8. The method of claim 7, wherein the transmission thermostat temperature is within five degrees Celsius of the engine thermostat temperature.

* * * * *